United States Patent [19]

Chaney

[11] Patent Number: 5,541,730
[45] Date of Patent: Jul. 30, 1996

[54] INTERFEROMETRIC MEASURING APPARATUS FOR MAKING ABSOLUTE MEASUREMENTS OF DISTANCE OR REFRACTIVE INDEX

[75] Inventor: Raymond J. Chaney, Berkeley, United Kingdom

[73] Assignee: Renishaw PLC, Gloucestershire, United Kingdom

[21] Appl. No.: 316,342

[22] Filed: Sep. 30, 1994

[30] Foreign Application Priority Data

Oct. 5, 1993 [GB] United Kingdom ............... 9320500 U

[51] Int. Cl.$^6$ ................................. G01B 9/02
[52] U.S. Cl. .................. 356/358; 356/345; 356/361
[58] Field of Search ........................ 356/350, 358, 356/361, 345

[56] References Cited

U.S. PATENT DOCUMENTS

| | | |
|---|---|---|
| 3,970,389 | 7/1976 | Mendrin et al. . |
| 4,865,453 | 9/1989 | Gidon et al. ............... 356/358 |
| 4,941,744 | 7/1990 | Yokokura et al. . |
| 4,984,898 | 1/1991 | Hofler et al. ............... 356/358 |
| 5,073,024 | 12/1991 | Valette et al. ............... 356/345 |
| 5,396,328 | 3/1995 | Jestel et al. ............... 356/358 |
| 5,459,571 | 10/1995 | Dammann et al. ............... 356/345 |

FOREIGN PATENT DOCUMENTS

| | | |
|---|---|---|
| 0516044A2 | 12/1992 | European Pat. Off. . |
| 591911A2 | 4/1994 | France . |
| 87066731 | 9/1988 | Germany . |
| 3837593 | 5/1990 | Germany . |
| 4305458 | 8/1994 | Germany . |
| WO9112487 | 8/1991 | WIPO . |
| WO91/12487 | 8/1991 | WIPO . |
| WO9206353 | 4/1992 | WIPO . |

*Primary Examiner*—Samuel A. Turner
*Assistant Examiner*—Robert Kim
*Attorney, Agent, or Firm*—Oliff & Berridge

[57] ABSTRACT

An absolute interferometer has part of the beam paths making up its measuring and reference arms formed in a waveguide, and part formed in air. The part formed in the waveguide are common mode so that the path length difference is formed in air, thus minimizing inaccuracies in the measurements caused by temperature changes in the waveguide. Phase modulators in the waveguide enable interpolation of the fringe counts to be made to high resolution. The absolute interferometer may be combined with a tracking interferometer, and with air refractometers, all of which have parts of their measuring and reference arms in the waveguide in common mode and symmetrical with each other.

9 Claims, 2 Drawing Sheets

INTERFEROMETRIC MEASURING APPARATUS FOR MAKING ABSOLUTE MEASUREMENTS OF DISTANCE OR REFRACTIVE INDEX

The present invention relates to interferometric distance measuring apparatus and in particular relates to such apparatus which measure distances in absolute terms.

It is known, for example, from U.S. Pat. No. 3,970,389 to measure directly the path difference in an interferometer while that path difference is held constant. Hence where the fixed distance from the interferometer to an object is made the measuring arm of the interferometer that distance can be measured absolutely.

The method of measurement disclosed in U.S. Pat. No. 3,970,389 is to vary the frequency of the laser light source between two known values, thereby changing the wavelength of the laser and the optical path length through each of the measuring and reference arms of the interferometer. Using a detector to count the interference fringes generated by a photo-electric detector which receives the combined beam returning from the measuring and reference arms, the path difference between the measuring and reference arms can be determined.

Laser diodes are now commonly proposed as light sources for interferometric measurement apparatus because of their advantages of size and cost.

Substitution of a laser diode for the gas laser described in U.S. Pat. No. 3,970,389 is not, however, a straightforward process. First of all it is not easy to vary the frequency of a laser diode between two specific frequencies with great accuracy, and secondly, with the most commonly used laser diodes the range of frequencies over which the laser diodes can be varied continuously is limited to around 100 parts per million (ppm). This requires high precision interpolators to achieve the high accuracies, or high resolutions required for some interferometers.

High precision interpolators are known from fibre optic gyroscope technology. These interpolators use the principle of phase modulation.

It is known to produce phase modulation in light passing through waveguides. European Patent Publication No. EP 516044-A2 describes a tunable laser diode formed on a semiconductor substrate. The described diode includes waveguide portions formed in the substrate and electrodes for modulating the refractive index of the waveguides, which in effect produces phase modulation in the light passing down the waveguide.

However, the materials from which waveguides are made have thermal coefficients associated with length and refractive index which are significantly different than in air, so that temperature changes may give rise to significant variations in the optical path lengths through the waveguide.

One object of the present invention is to provide an absolute interferometer, in which light from a laser of variable frequency is passed through a waveguide and in which the problems associated with the thermal properties of the waveguide are minimised.

In accordance with fulfilling this object, the optical beam paths in both of the measuring and reference arms of the interferometer are formed partly in the waveguide and partly in air, and those parts of the beam paths which are formed in air are of such a length that at least the path length difference of the two beam paths is formed solely in the air, the remaining parts of the beam paths which are formed in the waveguide being of equal length.

The size of the waveguide is a compromise between the conflicting requirements of keeping it as small as possible to minimise any residual errors due to differential thermal expansion caused by non-uniformity of the material from which it is made, and the minimum size required to achieve symmetry of the beam paths and to enable the optical components to be formed thereon including the requirement to get the light beams in and out.

In a preferred embodiment the interferometric measuring apparatus of the invention includes two interferometers one operating as a reference interferometer having fixed so-called reference and measuring arms, the other operating as a measuring interferometer in which the measuring arm is the variable distance to the object being measured. Preferably in this embodiment the reference arms of the measuring interferometer and the reference interferometer are combined into a single path.

Also in a preferred embodiment the laser light source used is a laser diode known per se which may be formed in the waveguide itself. Where high resolution is required of the interferometer, known phase modulators may be formed in the waveguide in order to provide for high precision interpolation of the interferometer fringe count.

Examples of the interferometric measuring apparatus of the invention will now be described with reference to the accompanying drawings in which.

Figure 1:
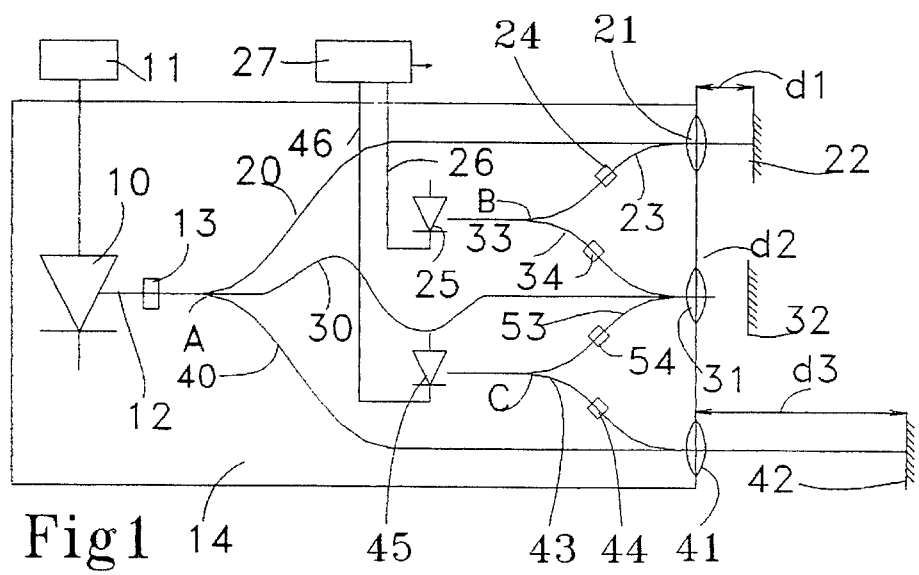
FIG. 1 illustrates diagrammatically the beam path layout of an absolute interferometer of the present invention.

Referring now to the drawings, In FIG. 1 there is shown a laser beam generator 10, in this example a laser diode, which generates a laser beam 12 which is directed through an optical isolator 13 into a waveguide formed on a light transmitting silicon chip 14. The laser diode may be external to the chip or may, as illustrated, be bonded onto the chip to form an integral part thereof.

The frequency of the light produced by the laser diode is continuously variable between two frequencies $v_1$ and $v_2$ to produce wavelengths $\lambda_1$ and $\lambda_2$, for example by means of a drive current modulator 11. The maximum rate of change of the frequency of the laser is limited by the capacity of the detector system to count interference fringes generated by the changing frequency.

The waveguide divides the laser beam 12 into three secondary beams directed along beam paths 20, 30 and 40 which define the so-called measuring and reference arms of two fixed length interferometers.

A first one of the interferometers (the reference interferometer) has its so-called measuring arm defined by fixed beam path 20 which extends partly within the chip from junction A, at which the waveguide divides into the three beam paths, to a lens 21 at the end of the chip. After passing through the lens 21 the laser beam enters the atmosphere and travels a distance $d_1$ to a fixed reflector 22 which reflects it back to the chip at lens 21.

At this point the beam enters another part of the waveguide which guides the beam along a beam path 23 through a phase modulator 24 to a photodiode detector 25.

The so-called reference arm of the first interferometer is defined by a fixed beam path 30 which extends within the chip from junction A to a lens 31 at the end of the chip. After passing through lens 31 the laser beam enters the atmosphere and travels a distance $d_2$ to a fixed reflector 32 which reflects it back to the chip at the lens 31. At this point the beam enters another part of the waveguide which guides the beam along a beam path 33 through a phase modulator 34 to the photodiode detector 25. The beams in paths 23 and 33 are re-combined at junction B within the waveguide ahead of the photodiode detector 25.

The distances $d_1$ and $d_2$ are arranged to be different so that as the wavelength of the laser diode 10 is varied in known manner by varying the driving current using the drive current modulator 11, interference will be generated in the combined beam which will be detected as an interference fringe count at the photodiode detector 25.

The photodetector 25 is illustrated in diagrammatic form only and it is to be understood that this photodiode (and all of the other photodiodes referred to later in this specification) include the counters and electronics necessary to enable them to produce output signals from the fringe counts indicative of the different parameters being measured.

In this example the output signal 26 produced by the photodiode 25 is indicative of the refractive index of the medium and is passed to a signal processor 27.

The second one of the interferometers (the measuring interferometer) has its measuring arm defined by beam path 40 which extends within the chip from junction A to a lens 41 at the end of the chip. After passing through the lens 41 the laser beam enters the atmosphere and travels a distance $d_3$ to a reflector 42 carried by the object the position of which to be measured, and which reflects it back to the chip at the lens 41. At this point the beam enters another part of the waveguide which guides the beam along a beam path 43 through a phase modulator 44 to a photodiode detector 45.

The reference arm of the measuring interferometer has parts in common with the reference arm of the reference interferometer. The common part is defined by beam path 30 the distance $d_2$, and reflector 32. Light reflected back to the chip from the reflector 32 enters the waveguide at lens 31 and travels along a beam path 53, passing through a phase modulator 54 before being re-combined at junction C with the beam in path 43 and passing to photodiode detector 45.

As before the distance $d_3$ is arranged to be different to $d_2$ so that as the wavelength of the laser diode is varied the photodiode detector will detect interference fringes and will produce an output 46 indicative of the difference in the reference and measuring arm of the measuring interferometer. The output 46 is passed to the signal processor 27.

Since the lengths of the beam paths in the waveguide are known from its construction details, and the distances $d_1$ and $d_2$ are known fixed distances, the difference in the fringe counts from the two detectors 25 and 45 gives a direct and absolute measure of the distance $d_3$ of the object from the interferometer.

The determination of the unknown distance $d_3$ by the signal processor 27 is as follows.

Let $m_1$ and $m_2$ respectively be the number of wavelengths in the path length difference $d_2-d_1$ at wavelengths $\lambda_1$ and $\lambda_2$ $m_1'$ and $m_2'$ respectively be the number of wavelengths in the path length difference $d_3-d_2$ at wavelengths $\lambda_1$ and $\lambda_2$ $\Delta\lambda$ be the range of the wavelength change between $\lambda_1$ and $\lambda_2$ of the laser diode 10 during the measurement, then:

For the reference interferometer, because the path lengths of the parts of the beams of the reference and measuring arms which are in the waveguide are equal, the path length difference is simply $d_1-d_2$ in air, and we can write $$m_1\lambda_1 = d_2 - d_1$$

similarly $$m_2\lambda_2 = d_2 - d_1$$

thus the fringe count at detector 25 is $$m_2 - m_1 = (d_2 - d_1)\frac{\Delta\lambda}{\lambda_1\lambda_2}$$

For the measuring interferometer we again have equal path lengths in the waveguide for the measuring and reference arms so that the path length difference is the distance $d_3-d_2$ in air. Thus we can write the fringe count at detector 45 is $$m_2' - m_1' = (d_3 - d_2)\frac{\Delta\lambda}{\lambda_1\lambda_2}$$

Therefore $$\frac{m_2' - m_1'}{m_2 - m_1} = \frac{d_3 - d_2}{d_2 - d_1}$$

from which $d_3$ can be determined.

The phase modulators are used to alter the optical path lengths in the waveguide such that the path length difference between the measuring and reference arms produces a whole number of fringe counts. That is the voltage output of the detector is equal to a reference voltage when the frequency of the laser diode 10 is at $v_1$ and $v_2$. This situation can be detected with the required accuracy. The voltage applied to the phase modulator to achieve this result can also be accurately determined and provides the interpolation value to be added to or subtracted from the integer fringe count.

It can be seen that the path lengths of the measuring and reference arms within the waveguide are equal and symmetrical so that they are common mode, that is, they all pass through the same length of the waveguide material and the same number of optical components formed therein for example, the phase modulators. Thus any uniform variation in temperature of the chips will have the same effect on the path lengths of the measuring and reference arms in the waveguide, and errors due to such temperature changes will have no effect on the calculation of distance $d_3$. Also the distance $d_3$ is determined from the ratio of two path lengths in the same air so that any uniform variations in the atmospheric conditions will have the same effect on the path lengths and will be eliminated in the calculation.

The distances $d_1$ and $d_2$ in the air can be quite small, e.g. up to 5 mm, and can be set by connecting the reflectors to the chip by short lengths of material of low or zero coefficient of expansion. Such a material is, for example, sold under the trade name of ZERODUR. The length of $d_3$, of course, depends on the distance of the object being measured and may be many meters.

However, non-uniform changes in atmospheric conditions along the path length of the measuring arm, may still affect the measurements of the apparatus. This problem can be minimised by arranging that the path length in air of the measuring arm of the reference interferometer is comparable to the path length in air of the measuring arm of the measuring interferometer, i.e. $d_1$ is comparable to $d_3$. By this means the optical properties of the air are averaged over the whole path length. An additional benefit is that the interpolator in the reference arm need not be any better than that in the measuring arm.

The actual (or absolute) distance measurement from the interferometer to the object must be related to a reference point associated with the interferometer. Thus the interferometer needs to be calibrated to establish the reference point.

This is conveniently the position of the object at which the path length difference between the measuring arms of the reference interferometer and the measuring interferometer is zero, which gives a zero reading from the detector system. This calibration needs to be done only once, and thereafter further interferometer readings will always give the absolute distances to the object from that position.

The absolute interferometer described above includes a reference interferometer. This is only a requirement when the two end frequencies $\lambda_1$ and $\lambda_2$ are not accurately known. Where the laser being used can be varied between two accurately known frequencies the reference interferometer can be eliminated thus simplifying the interferometer design. In such a design the calibration is performed by moving the mirror 42 until the length $d_2$ is equal to length $d_3$.

A problem with the application of an absolute interferometer of the above-described type in measuring positions of objects on coordinate measuring machines (CMMs) and machine tools is that the distance to be measured has to be fixed for each measurement. However, machine vibration will cause movement of the object mirror which will produce inaccuracies in the measurement due to the velocity of the movement of the object. Also it may be a requirement to take readings of the instantaneous position of an object during its movement, and in these circumstances the reading of the absolute interferometer will be inaccurate due to the velocity of the object.

The solution to this problem is described in U.S. Pat. No. 3,970,389 which is to provide an additional tracking interferometer, the readings of which are synchronised with the readings of the absolute interferometer to provide a correction to the readings of the absolute interferometer for the velocity of the object.

An alternative solution, from the technology of chirped radar would be to take many readings very rapidly to determine the velocity of the moving target and hence the distance at any given time.

Figure 2:
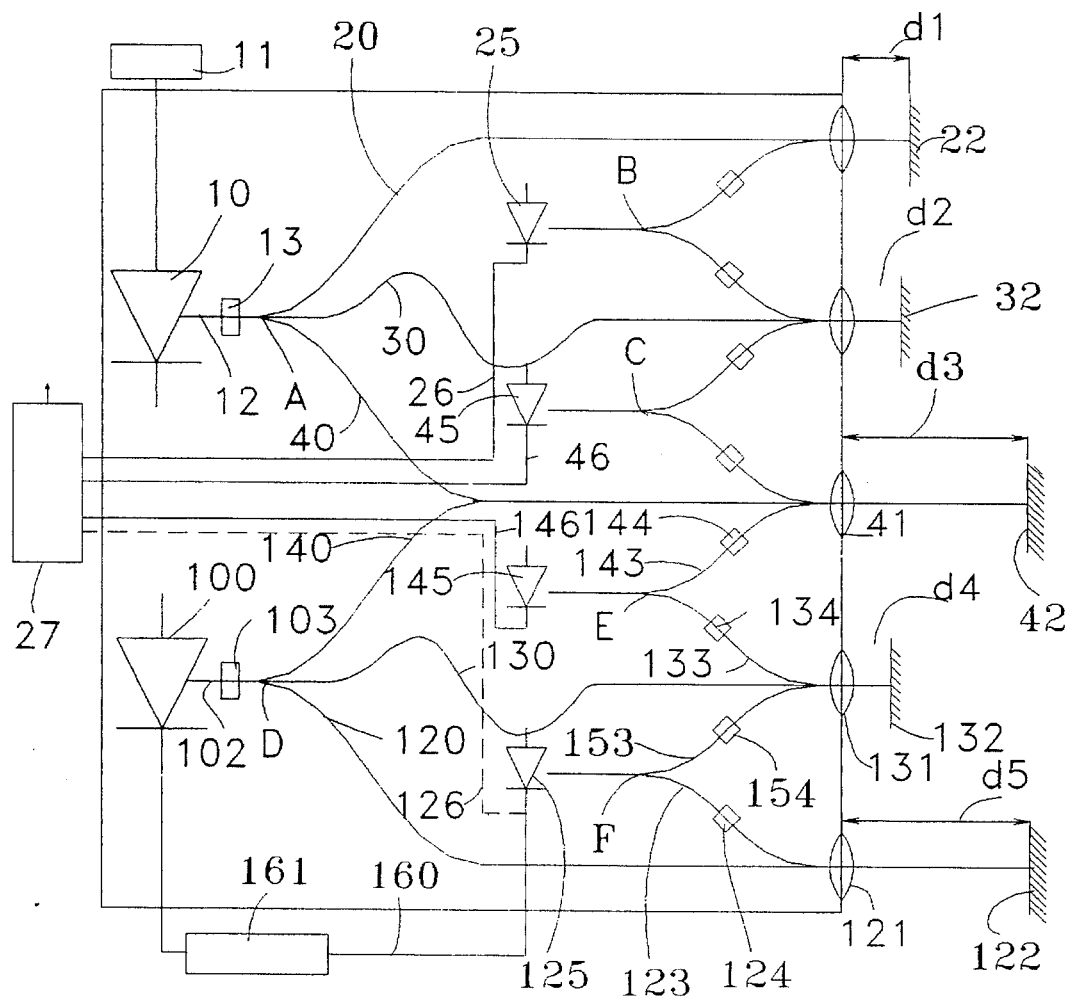
FIG. 2 illustrates a combined absolute and tracking interferometer of the present invention.

FIG. 2 shows an interferometric measuring apparatus for solving the problem of a moving target which combines the absolute interferometer of the present invention with a tracking interferometer formed in the same chip.

The absolute interferometer is identical to that described with reference to FIG. 1, and is not described in detail again. The same reference numerals are applied to its components. Because the absolute interferometer shown in this example includes both a reference interferometer and a measuring interferometer, the tracking interferometer shown in FIG. 2 includes both a variable length measuring interferometer which measures the distance of the object, and an additional fixed measurement interferometer in order to maintain symmetry on the chip so that temperature variations are common mode.

The tracking interferometer is powered by a laser diode 100 the frequency of which is stabilised at a nominally fixed value, for example by controlling a parameter of the laser, e.g. the driving current or the temperature. The same phase detection method is used because the readings from the tracking interferometer need to be synchronised with those of the absolute interferometer, and the response time of the electronic circuits will need to be the same for all of the measurement and reference interferometers.

The light beam 102 from the laser diode 100 of the tracking interferometer passes via an optical isolator 103 into a waveguide which divides the beam 102 at junction D into three beam paths 120, 130 and 140 in the chip 14.

The variable length measuring interferometer has its measuring arm defined by the beam path 140 which extends partly within the chip from junction D, and has a part in common with the beam path 40 of the measuring arm of the absolute interferometer terminating at the lens 41 at the end of the chip. The beam in beam path 140 emerges from lens 41 and travels a distance $d_3$ before being reflected from the moving reflector 42, the position of which is to be measured, back to the lens 41.

At this point the beam enters another part of the waveguide which guides the beam along a path 143 through a phase modulator 144 to a photodiode detector 145.

The reference arm of the variable length measuring interferometer is defined by a fixed beam path 130 which extends within the chip from junction D to a lens 131 at the end of the chip. After passing through the lens 131 the beam enters the atmosphere and travels a distance $d_4$ to a fixed reflector 132 which reflects it back to the chip at the lens 131. At this point the beam enters another part of the waveguide which guides the beam along a path 133 through a phase modulator 134 to the photodiode detector 145. The beams in the paths 143 and 133 are recombined at junction E within the waveguide ahead of the photodiode detector 145.

Since the distances $d_3$ and $d_4$ are different and the path length difference is varying due to the vibration or movement of the moving reflector 42, interference will be generated in the combined beam which will be detected as an interference fringe count at the detector 145. The detector 145 generates an output signal 146 indicative of the relative displacement of the object.

Thus the output of the detector 145 is passed to the signal processor 27 and may be used to correct the distance measurement produced from the outputs of the detectors 25, 45 of the absolute interferometer for the effects of the velocity of the object due to vibration of the reflector 42. Alternatively the signal 46 from the detector 45 can be used to correct the reading of the tracking interferometer so that its reading relates to the known reference position.

The second of the measuring interferometers is very similar to the reference interferometer of the absolute interferometer and has fixed length measuring and reference arms.

The fixed length measuring arm of this interferometer is defined partly in the chip by a beam path 120 which extends from junction D to a lens 121. From the lens 121 the beam travels a fixed distance $d_5$ through atmosphere to a reflector 122 which reflects it back to the chip at lens 121. At this point it enters another part of the waveguide which guides the beam along a beam path 123 through a phase modulator 124 to the photodiode detector 125.

The reference arm of this interferometer is common with the reference arm of the first measuring interferometer from junction D to the lens 131, along distance $d_4$ in air to the optic 132 and back to the lens 131. At this point the waveguide provides a further beam path 153 from lens 131 through a phase modulator 154 before joining beam path 133 at junction F where the reference and measuring beams are combined before reaching photodiode detector 125.

Since the path lengths of the measuring and reference arms of this interferometer are fixed interference will only be detected at detector 125 and an output signal 126 will only be produced by the detector 125 if the wavelength of the laser diode varies. Thus, as shown in this example, the output signal 126 of the detector 125 may be fed to a current controller 161 in a feedback loop 160 to vary the drive current of the laser diode 100 to stabilise the wavelength of the beam 102.

In an alternative embodiment however the output signal 126 is passed to the signal processor 127 (as shown in dotted lines) which corrects the absolute position of the object as determined from the outputs 26,46,146 of detectors 25,45, 145 for variations in the wavelength of the laser diode 100.

Thus it can be seen that by the addition of the tracking interferometer, the interferometric measuring apparatus can produce not only an absolute interferometer using laser diodes on a chip which does not suffer from inaccuracies due to variations in temperature, but which can also compensate for any movement of the target optic due to vibration or measure the instantaneous position of a moving object.

To minimise the effects of atmospheric changes the path lengths $d_1, d_3$ and $d_5$ may be made to be of similar lengths.

To ensure that the different frequency beams from the two laser diodes after reflection from mirror 32 do not interfere with the measurement signals in the detectors, the wavelength difference between the two diodes is arranged to be at least 5 nanometers. Alternatively filters may be used in the beam paths to filter out the unwanted frequency.

Figure 3:
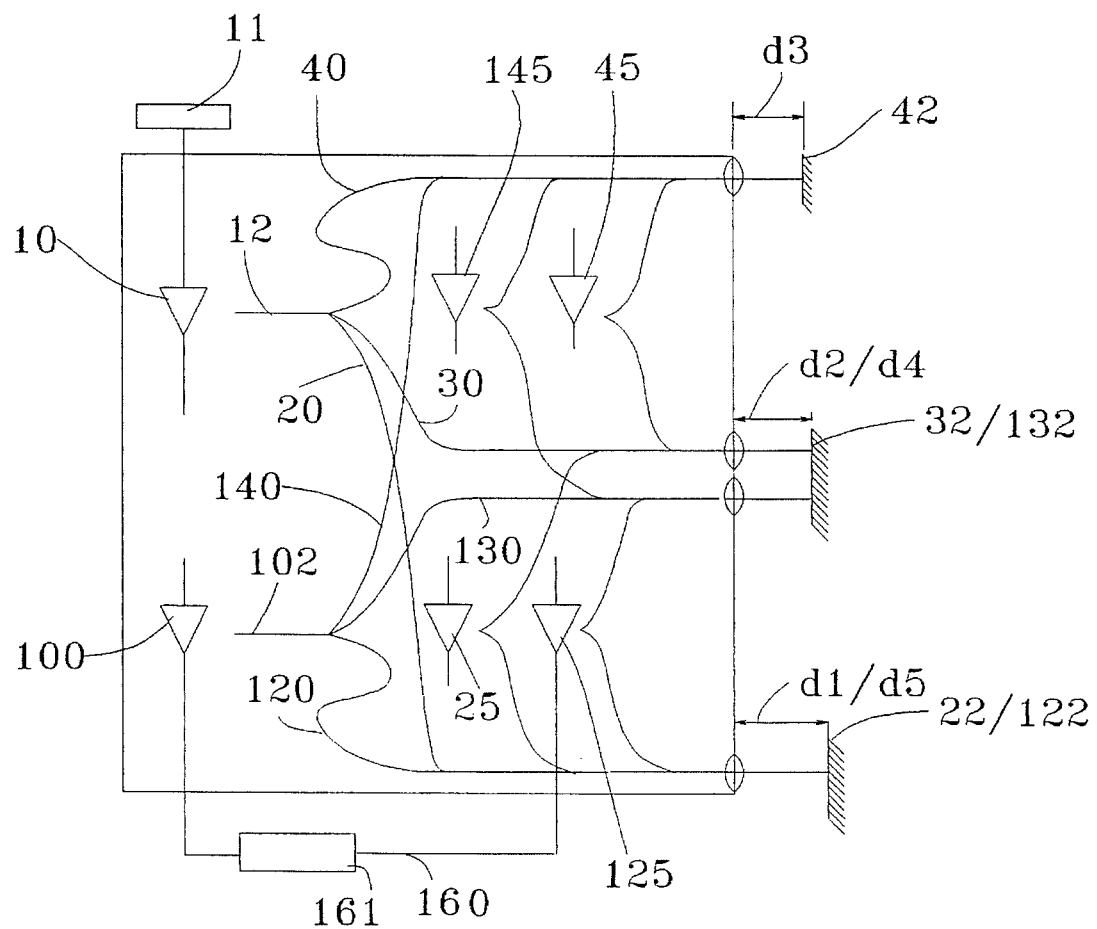
FIG. 3 illustrates a more compact version of the combined tracking and absolute interferometer illustrated in FIG. 2.

FIG. 3 shows a variation in the design of the interferometric measuring apparatus of FIG. 2 in which as many as possible of the beam paths are combined to minimise the size of the chip and the number of optical components, and the effects of the environment.

To achieve this, the waveguide on the chip splits the laser beam 12 from the first laser diode 10 into three beam paths 20,30 and 40. Path 40 provides part of the path length to the movable target reflector 42 on the object to be measured, path 30 provides part of the path length to the reference reflector 32 and path 20 provides part of the path length of the second measuring arm to a fixed reflector 22.

The waveguide on the chip also splits the laser beam 102 from the second laser 100 into three beam paths 120,130 and 140. Path 140 provides part of the path length to the movable target reflector 42 on the object, path 130 provides part of the path length to the reference reflector 32 (which takes the place of reference reflector 132 in FIG. 2), and path 120 provides part of the path length of the second measuring arm to the fixed reflector 22 (which takes the place of the fixed reflector 122 of FIG. 2).

To avoid interference on the detectors from the returning beams of different frequencies, the detectors 45,25 have to be sensitive only to the frequency of the light from the laser diode 10, and detectors 125,145 have to be sensitive only to the frequency of the light from the laser diode 100.

Alternatively, optical filters can be used in the return beam paths to prevent light of the wrong frequency falling on the detectors. The difference in frequency between the two laser diodes 10,100 is determined by the optical properties of the filters.

It is to be understood that the optical isolators, and phase modulators and other features of the embodiment shown in FIG. 2 will also be included, but are omitted from the drawing to enable the beam paths to be illustrated more clearly.

The invention has been described with plane mirrors as the reflecting elements at the ends of the various reference and measuring arms, but with a straightforward modification to the layout of the waveguide, other reflectors, for example corner cube retroreflectors, may be substituted for the plane mirrors.

Also, the preferred embodiments above have been described using waveguides on a chip. However, the benefits of the invention can still be obtained if optical fibres are substituted for the waveguides.

Different materials may be used for the chip structure depending on different requirements for the apparatus. For example, with Silicon chips a low voltage may be used for the phase modulators, which is an advantage, but only infra-red light can be used. Alternatively a Lithium Niobate chip can use visible light, but requires much higher voltages than Silicon to produce phase modulation in the waveguides.

In the combined interferometer arrangement shown in FIG. 1 the path lengths $d_1, d_2$ and $d_3$ for any given measurement are fixed but unequal.

As explained above, the measuring interferometer in combination with the reference interferometer will provide an absolute measure of the distance $d_3$ from a reference position which is corrected for the refractive index of the air.

Another novel feature of the invention is that the measuring interferometer can act alone as an absolute interferometer when the refractive index of the air is accurately known, and the reference interferometer can act alone as an air refractometer when the path length $d_1-d_2$ is accurately known.

The invention also includes therefore an air refractometer alone and a distance measuring interferometer alone which make use of the novel waveguide arrangement described above.

Similarly the invention also includes a tracking interferometer alone which makes use of the novel waveguide arrangement described above.

Although all of the fixed mirrors have been illustrated as being spaced from the waveguide it is also envisaged that the path lengths of one or more of the reference beam paths in the air could be zero, whereby the whole of the path length difference in the air or other medium is defined by the measuring arm. This could be achieved for example by attaching the reference mirror to the exterior of the waveguide.

Where the measuring apparatus includes more than one interferometer it is also possible that only one of the reference beam path and the measuring beam path of each interferometer is formed in the waveguide, provided that the path lengths of each interferometer defined in the waveguide are equal and symmetrical. This may mean that only one phase modulator is provided in the measuring arm and one in the reference arm.

Although common reference paths have been shown in all of the embodiments having multiple interferometers, the reference arms of different interferometers may have individual reference beam reflectors, provided symmetry is maintained in the path lengths of each separate interferometer defined in the waveguide.

Also the tracking interferometer and its associated interferometer for measuring the refractive index of air could be entirely separate from the absolute interferometer and its associated interferometer for measuring the refractive index of air.

I claim:

1. An interferometric measuring apparatus for making absolute measurements of distance or refractive index, comprising:

a laser light source for producing a light beam;

a waveguide in the path of the light beam, the waveguide including a first portion for dividing the light beam into secondary beams, and a second portion which recombines the secondary beams;

reflectors external to the waveguide for reflecting secondary beams leaving the waveguide back to the second portion of the waveguide, at least one of said reflectors being disposed in a medium external to the waveguide;

a detector for producing from the recombined secondary beams an interference fringe count, and for generating an output signal in dependence upon said fringe count, the secondary beams forming measuring and reference arms of an interferometer, each of which arms is defined by a beam path extending from said first portion of the waveguide to a respective one of the reflectors and back through the second portion of the waveguide to the detector;

phase modulators in the waveguide, one in each of the measuring and reference arms of the interferometer; and a signal processor which receives the output signal from the detector and produces an output indicative of one of said distance and refractive index measurements, wherein:

the beam path lengths of the portions of the measuring and reference arms which are not in the medium are equal and symmetrical, to within the required accuracy of the measurement being made, the laser is a variable frequency laser, the frequency of which varies continuously over a known range, and the phase modulators operate to alter the optical path lengths of the beams in the waveguide to produce an integer number of fringe counts in the detector.

2. The interferometric measuring apparatus according to claim 1, wherein:

the reflector in the reference arm is a fixed reference reflector;

the reflector in the measuring arm is connected to an object disposed in said medium the distance of which in the medium from a known position of the fixed reference reflector is to be measured without the need for the object to be moved; and the signal processor produces an output indicative of the absolute position of the object relative to the position of the fixed reference reflector.

3. The interferometric measuring apparatus according to claim 1, wherein:

the beam paths defining the measuring arm and the reference arm of the interferometer define a known fixed path length difference in said medium between the measuring arm and the reference arm, and the signal processor produces an output indicative of the refractive index of said medium.

4. An interferometric measuring apparatus for making absolute measurements of distance, comprising:

a laser light source for producing a light beam of continuously varying frequency;

a waveguide in the path of the light beam, the waveguide including a first portion for dividing the light beam into secondary beams, and a second portion which for recombing the secondary beams;

reflectors external to the waveguide for reflecting secondary beams leaving the waveguide back to the second portion of the waveguide, at least two of said reflectors being disposed in a medium external to the waveguide;

two detectors for producing from the recombined secondary beams interference fringe counts, and for generating output signals in dependence upon said fringe counts, the secondary beams forming measuring and reference arms of two interferometers each of which arms is defined by a beam path extending from said first portion of the waveguide to a respective one of the reflectors and back through the second portion of the waveguide to one of the detectors;

phase modulators in the waveguide, one in each of the measuring and reference arms of both of the interferometers; and a signal processor which receives the output signals from the detectors wherein, the path lengths of the portions of the measuring and reference arms which are not in the medium are equal and symmetrical, to within the required accuracy of the measurement being made;

the phase modulators operate to alter the optical path lengths of the beams in the waveguide to produce an integer number of fringe counts in the detector, in a first one of the interferometers, the reflector in the measuring arm is connected to an object disposed in said medium and the distance of which in the medium from a known reference position of the reference reflector is to be measured without the need for the object to be moved, in the second one of the interferometers the beam paths defining the measuring and reference arms define a known fixed path length in said medium between the measuring and reference arms; and the signal processor produces an output indicative of the absolute position of the object relative to the position of the fixed reference reflector and independent of variations in the refractive index of the medium.

5. The interferometric measuring apparatus according to claim 4, wherein the first portion of the waveguide divides the light beam into three secondary beams which form the measuring and reference arms of the two interferometers, the reference arms of the two interferometers being defined by beam paths lengths have parts of their path lengths in common.

6. The interferometric measuring apparatus according to claim 4, wherein there is further provided a tracking interferometer for measuring the movement of the object and which further comprises:

a second laser light source for producing a second light beam of nominally fixed frequency;

a beam divider for dividing the second light beam into secondary beams which form measuring and reference arms of the tracking interferometer, the secondary beam in the reference arm of the tracking interferometer being directed towards and reflected from a fixed reference reflector, the secondary beam in the measuring arm of the tracking interferometer being directed towards a reflector on the object and being reflected thereby before being recombined with the secondary beam reflected from the reference reflector;

a detector disposed in the path of the recombined beam for producing therefrom an interference fringe count and for generating an output signal in dependence upon said fringe count; and signal processing means which receives the output signal from the detector and produces an output indicative of the movement of said object.

7. The interferometric measuring apparatus according to claim 6, wherein:

the waveguide is disposed in the path of the second light beam;

a third portion of the waveguide divides the second light beam into the two secondary beams and a fourth portion of the waveguide recombines the secondary light beams from the second light source after reflection from the respective reflectors, the measuring and reference arms of the tracking interferometer are each defined by a beam path extending from the third portion of the waveguide to a respective one of the reflectors and back through the fourth portion of the waveguide to the detector, phase modulators are provided in the waveguide, one in each of the measuring and reference arms of the tracking interferometer and which operate to alter the optical path lengths of the beams in the waveguide to produce an integer number of fringe counts in the detector, the beam path lengths of the portions of the measuring and reference arms of the tracking interferometer which are not in the medium are equal and symmetrical to within the required accuracy of the measurement being made, the signal processing means forms part of the signal processor, and the signal processor produces an output indicative of the position of the object relative to the position of the fixed reference reflector corrected both for changes in the refractive index of the medium and for movements of the object.

8. The interferometric measuring apparatus according to claim 6, wherein there is further provided a fourth interferometer for measuring changes in the refractive index of the medium in which the object is disposed, said fourth interferometer comprising:

a beam divider for dividing the second light beam into further secondary beams which form measuring and reference arms of the fourth interferometer;

two fixed reflectors for reflecting the secondary beams, and disposed relative to each other so as to define a fixed path length difference in the medium between the measuring and reference arms of the fourth interferometer;

means for recombining the secondary beams after reflection from the reflectors;

a detector disposed in the recombined secondary beams for producing therefrom an interference fringe count and for generating an output signal in dependence upon said fringe count;

signal processing means which receives the output signals from the detector and produces an output indicative of any changes in refractive index of the medium.

9. The interferometric measuring apparatus according to claim 7, wherein there is further provided a fourth interferometer for measuring changes in the refractive index of the medium in which the object is disposed, said fourth interferometer comprising:

a beam divider for dividing the second light beam into further secondary beams which form measuring and reference arms of the fourth interferometer, two fixed reflectors for reflecting the secondary beams, and disposed relative to each other so as to define a fixed path length difference in the medium between the measuring and reference arms of the fourth interferometer;

means for recombining the secondary beams after reflection from the reflectors;

a detector disposed in the recombined secondary beams for producing therefrom an interference fringe count and for generating an output signal in dependence upon said fringe count;

signal processing means which receives the output signals from the detector and produces an output indicative of any changes in refractive index of the medium; and wherein, the third portion of the waveguide additionally divides the second light beam into the two secondary beams which form the measuring and reference arms of the fourth interferometer, which arms are defined by beam paths extending from the third portion of the waveguide to respective ones of the reflectors and back through the fourth portion of the waveguide to the detector, phase modulators are provided in the waveguide, one in each of the measuring and reference arms of the fourth interferometer and which operate to alter the optical path lengths of the beams in the waveguide to produce an integer number of fringe counts in the detector, the beam path lengths of the portions of the measuring and reference arms of both the fourth interferometer and the tracking interferometer which are not in the medium being equal and symmetrical to within the required accuracy of the measurement being made, the signal processing means of the fourth interferometer forms part of the signal processor, and the signal processor produces an output indicative of the position of the object relative to the fixed reference reflector and corrected for variations in the refractive index of the medium, for movements of the object and for variations in the wavelength of the light from the second light source.

\* \* \* \* \*